L. FRANZMEIER.
MOWER ATTACHMENT.
APPLICATION FILED NOV. 1, 1909.

973,421.

Patented Oct. 18, 1910.
4 SHEETS—SHEET 1.

L. FRANZMEIER.
MOWER ATTACHMENT.
APPLICATION FILED NOV. 1, 1909.

973,421.

Patented Oct. 18, 1910.

4 SHEETS—SHEET 4.

UNITED STATES PATENT OFFICE.

LOUIS FRANZMEIER, OF NEWTON, WISCONSIN.

MOWER ATTACHMENT.

973,421.  Specification of Letters Patent.  Patented Oct. 18, 1910.

Application filed November 1, 1909. Serial No. 525,603.

*To all whom it may concern:*

Be it known that I, LOUIS FRANZMEIER, a citizen of the United States, and resident of Newton, in the county of Manitowoc and State of Wisconsin, have invented certain new and useful Improvements in Mower Attachments; and I do hereby declare that the following is a full, clear, and exact description thereof.

My invention consists in what is herein particularly set forth with reference to the accompanying drawings and pointed out in claims, its object being to provide simple, economical and efficient side-delivery mower attachments by which to facilitate harvesting of pea-vines, clover and other vegetation of various kinds.

Figure 1:
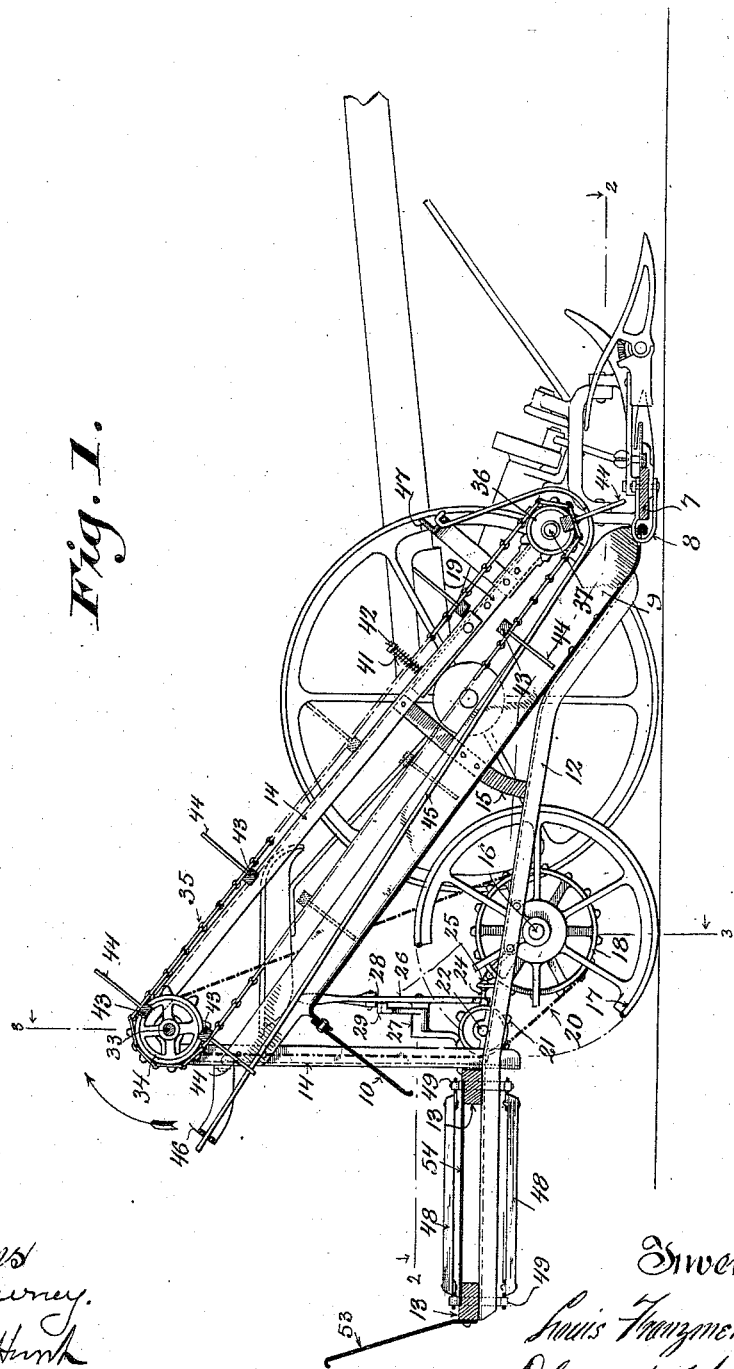
Figure 2:
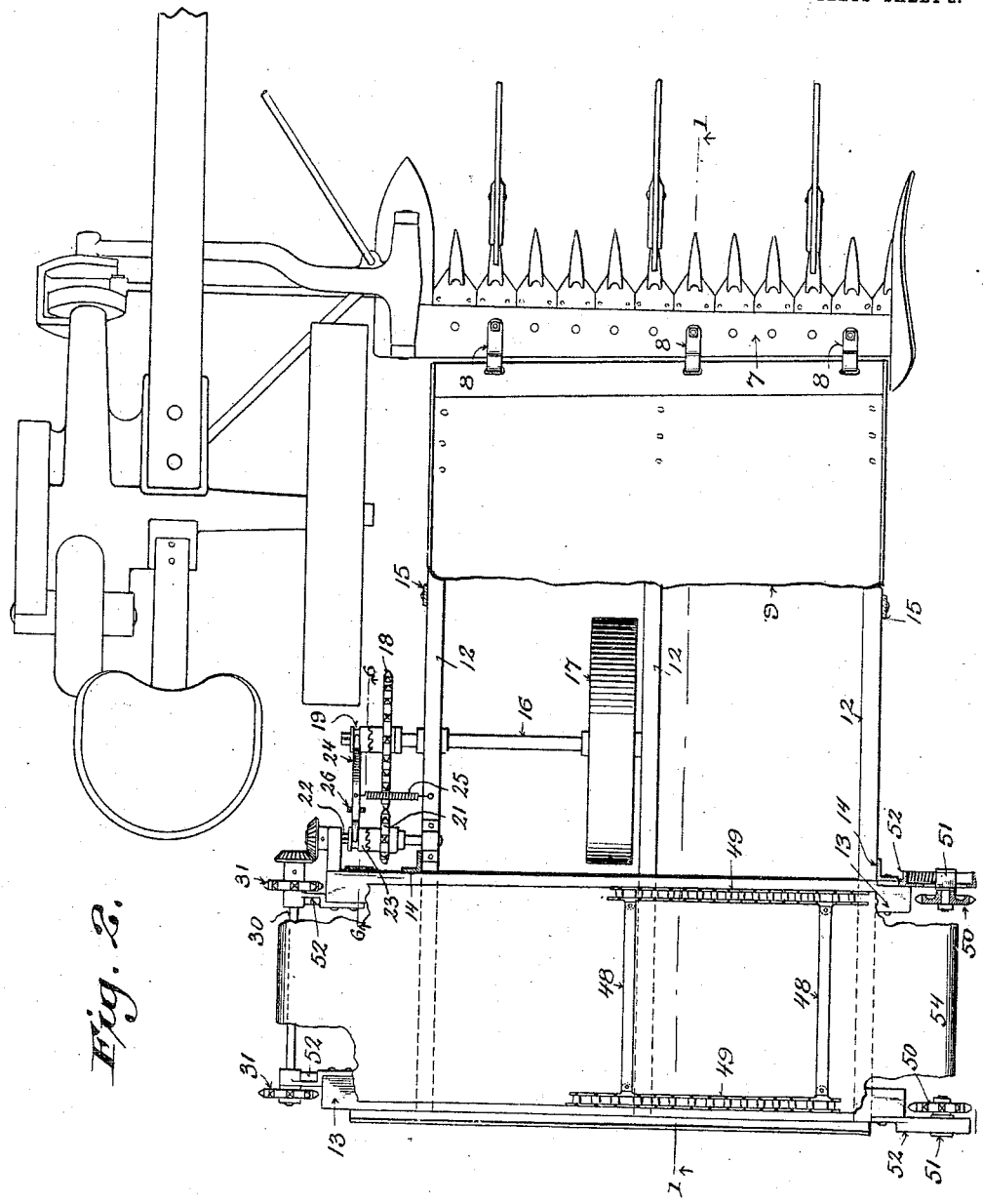
Figure 3:
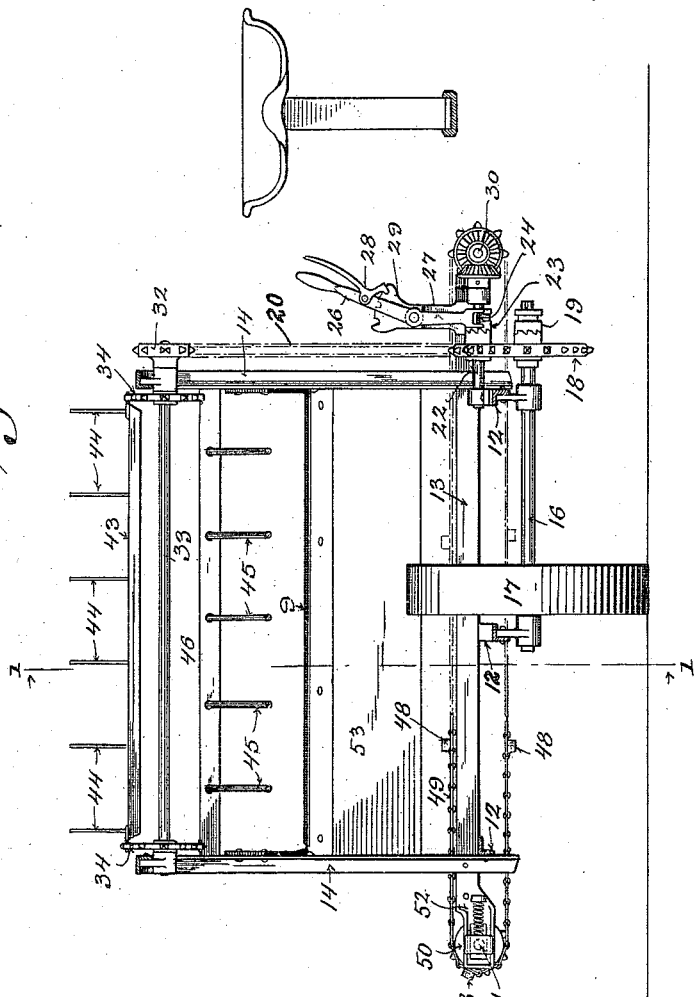
Figure 4:
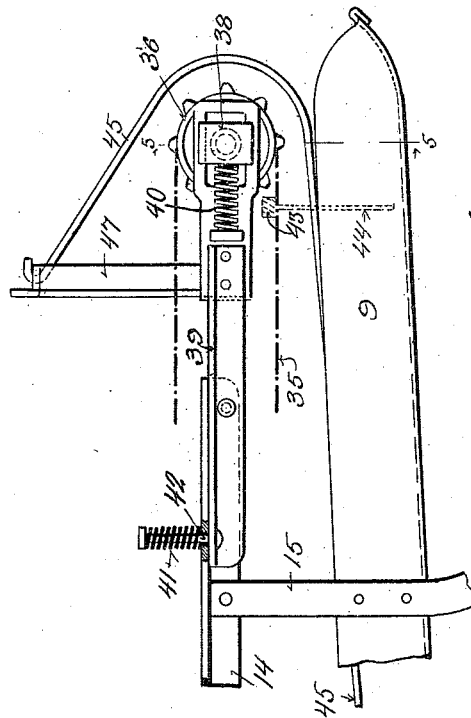
Figure 5:
Figure 6:
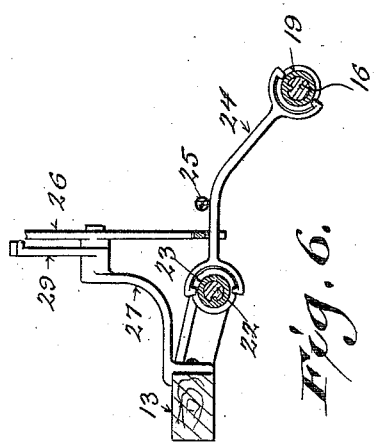

Figure 1 of the drawings represents a vertical longitudinal sectional view of an attachment in accordance with my invention applied to the finger-bar of an ordinary mower, the view being indicated by line 1—1 in Figs. 2 and 3; Fig. 2, a plan view of the attachment as aforesaid partly broken away and in horizontal section on planes of different elevation, as indicated by lines 2—2 in Fig. 1; Fig. 3, a transverse sectional view on different planes as indicated by lines 3—3 in Fig. 1; Fig. 4, a side elevation of a fragment of said attachment; Fig. 5, a sectional view on the plane indicated by line 5—5 in Fig. 4, and Fig. 6, a side elevation of another fragment of the attachment partly in section on the plane indicated by line 6—6 in Fig. 2.

Referring by numerals to the drawings, 7 indicates the finger-bar of an ordinary mower, and bolted thereto, through eyes of the same, are clevis-clips 8 engaging the lower end of a preferably sheet-metal inclined angular trough 9 having a depending rear upper flange to which a slide 10 is riveted or otherwise suitably secured. The trough is fastened upon the lower portions of suitably bent rearwardly-extending bars 12, that are preferably of light angle steel, and beams 13 are mounted on the horizontal rear portions of said bars. Rigidly secured to the bars 12, adjacent to the foremost beam 13, are vertical portions of partly inclined upper bars 14, that are similar in material and cross-section to those aforesaid. Tie-bars 15 are connected at their ends to the bars 12 and 14, all of these bars and the beams 13 being arranged and connected to constitute the frame of the mower-attachment herein specified.

Secured to a pair of the bars 12 are depending bearings for a shaft 16 that serves as the axle of a bull-wheel 17, that is independent of the bull-wheel of the mower. Carried on the shaft is a sprocket-wheel 18, the hub of which is made to constitute the fixed member of a clutch that has its adjustable member 19 splined on said shaft. A link-belt 20 connects the sprocket-wheel 18 with a similar wheel 21 that is carried on a spindle 22 for which the frame above specified is provided with bearings, the hub of the wheel 21 being also made to constitute the fixed member of a clutch having its adjustable member 23 splined on the spindle. Spanner-ends of a yoke 24 engage annular grooves in the adjustable members 19 and 23 of the clutches. A spring 25 is shown connecting the yoke with an adjacent frame-bar 12, and a lever 26, in connection with said yoke, is fulcrumed on a stud of a bracket 27 attached to said frame. The lever is shown provided with a pivotal latch-dog 28 engageable with any one of a series of three notches in a quadrant arm 29 of said bracket. In miter-gear connection with the spindle 22 is an arbor 30 for which the frame aforesaid is provided with bearings, and sprocket-wheels 31 are fast on the arbor. The link-belt 20 is also trained on a sprocket-wheel 32 fast on an arbor 33 in bearings attached to the frame-bars 14, and other sprocket-wheels 34 are rigidly connected to said arbor. Link-belts 35 of an endless elevator are trained on the sprocket-wheels 34 and similar wheels 36 on bearing studs 37 of spring-controlled slide-blocks 38 that are guided in longitudinal slots of spring-controlled pivotal extensions 39 of the frame-bars 14. The springs 40, one of which is shown in Fig. 4, are arranged under tension against the blocks 38 and serve to automatically tighten the elevator by which the material cut by the mower is carried up in the trough 9, there being automatic yield of the lower portion of said elevator against resistance of the springs 41 opposing the frame-bars 14 under heads of pins 42 that extend from the pivotal extensions 39 through apertures in said bars. The aforesaid elevator embodies lags 43, arranged at suitable intervals in connection with the link-belts 35, and teeth 44 extending in series from the lags, the sweep of these teeth at the lower end of the trough 9 being such that the cut material is readily caught and forced upward in said trough. To strip the cut material from the teeth of the elevator, spring-wire rods 45 are employed in connection with supports 46, 47, attached to the frame-bars 14, the rods being arranged longitudinally of the trough 9 on a plane at an acute angle to the bottom of the same, the greatest divergence of the rods being at the lower end of said trough. The elevated material finds its way down the slide 10 onto a horizontal side-delivery endless conveyer comprising lags 48 and link-belts 49 to which the lags are connected at suitable intervals. These link-belts engage the sprocket-wheels 31 and similar wheels 50 for which bearing-studs extend from spring-controlled slide-blocks 51 guided in slots of brackets 52 attached to the frame-beams 13. A rear upwardly extending shield 53 is provided in connection with a frame-beam 13 to hold material on the conveyer from which it has side-delivery.

When the lever 26 is in the position shown in Fig. 3, the adjustable clutch-members 19 and 23 are in engagement with the clutch-ends of the hubs of the sprocket-wheels 18 and 21 respectively to effect a continuous drive of the elevator and conveyer above specified, the result being a side-delivery of the cut material in a windrow, but by moving said lever far enough to have its latch-dog 28 catch in the middle notch of the quadrant 29, the clutch-member 23 will be disengaged from the hub of the sprocket-wheel 21 to stop the conveyer without disturbing the operation of the elevator so that the cut material may accumulate in a bunch on said conveyer and be discharged therefrom when said lever is returned to the former position. The stopping and starting of the conveyer independent of the elevator is performed intermittently to provide for side delivery of the cut material in bunches at varying distances apart. Whenever it is necessary or desirable to stop the elevator, as well as the conveyer, the lever 26 is adjusted until its latch-dog comes into engagement with the outermost notch of the quadrant 29, the adjustment of the clutch-members 23, 19, out of engagement with the hubs of the sprocket-wheels 21, 18, being one after the other as a result of change of fulcrum on the part of the lever-and-spring controlled yoke 24 aforesaid.

To prevent material falling through the conveyer, a shield 54 is provided in connection with the frame-beams 13.

I claim:

1. The combination of a frame, an inclined trough supported on the same, means for detachably connecting the assemblage aforesaid with the finger-bar of a mower, a bull-wheel having an axle for which the frame is provided with bearings, this bull-wheel being independent of the bull-wheel of the mower; an endless elevator operative in the trough, an endless horizontal side-delivery conveyer arranged to receive material discharged from the elevator, and clutch-controlled elevator and conveyer drive-gear in train with the bull-wheel axle.

2. The combination of a frame, an inclined trough supported on the same, clevis-clips and bolts for detachably connecting the trough with the finger-bar of a mower, a bull-wheel having an axle for which the frame is provided with bearings, this bull-wheel being independent of the bull-wheel of the mower; an endless elevator operative in the trough, an endless horizontal side-delivery conveyer arranged to receive material discharged from the elevator, and clutch-controlled elevator and conveyer drive-gear in train with the bull-wheel axle.

3. The combination of a frame having spring-controlled pivotal side-bar extensions, an inclined trough supported on the frame, means for detachably connecting the assemblage aforesaid with the finger-bar of a mower, a bull-wheel having an axle for which the frame is provided with bearings, this bull-wheel being independent of the bull-wheel of the mower; an endless elevator arranged to operate in the trough and which is connected at its lower end to said side bar extensions of said frame, an endless horizontal side-delivery conveyer arranged to receive material discharged from the elevator, and clutch-controlled elevator and conveyer drive-gear in train with the bull-wheel axle.

4. The combination of a frame, an inclined trough supported on the same, means for detachably connecting the assemblage aforesaid with the finger-bar of a mower, a bull-wheel having an axle for which the frame is provided with bearings, an endless toothed elevator operative in the trough, stripper-rods arranged longitudinally of said trough on a plane at an acute angle to the bottom of the same, their greatest divergence being at the lower end; an endless horizontal side-delivery conveyer arranged to receive material discharged from the elevator, and clutch-controlled elevator and conveyer drive-gear in train with the bull-wheel axle.

5. The combination of a frame, an inclined trough supported on the same, means for detachably connecting the assemblage aforesaid with the finger-bar of a mower, a bull-wheel having an axle for which the frame is provided with bearings, this bull-wheel being independent of the bull-wheel of the mower; an endless elevator operative in the trough, an endless horizontal side-delivery conveyer arranged to receive material discharged from the elevator, clutch-controlled elevator and conveyer drive-gear in train with the bull-wheel axle, and means by which to start and stop the conveyer without interference with the running of the elevator and to stop both at will.

6. The combination of a frame, an inclined trough supported on the same, means for detachably connecting the assemblage aforesaid with the finger-bar of a mower, a bull-wheel having an axle for which the frame is provided with bearings, an endless elevator operative in the trough, an endless horizontal side-delivery conveyer arranged to receive material discharged from the elevator, clutch-controlled elevator and conveyer drive-gear in train with the bull-wheel axle, a spring-controlled yoke connecting the adjustable members of the elevator and conveyer clutches, a yoke-controlling lever, and means for latching the lever in adjusted position to cause simultaneous operation of said elevator and conveyer, a stop of the conveyer without interference with the running of the elevator and to stop both at will.

7. The combination of a frame having spring-controlled pivotal side-bar extensions, an inclined trough supported on the frame, means for detachably connecting the assemblage aforesaid with the finger-bar of a mower, a bull-wheel having an axle for which the frame is provided with bearings, an endless toothed elevator arranged to operate in the trough and which is connected at its lower end to said side bar extensions of the frame, stripper-rods arranged longitudinally of said trough on a plane at an acute angle to the bottom of the same, their greatest divergence being at the lower end; an endless horizontal side-delivery conveyer arranged to receive material from the elevator, clutch-controlled elevator and conveyer drive-gear in train with the bull-wheel axle, and means by which to start and stop the conveyer without interference with the running of the elevator and to stop both at will.

In testimony that I claim the foregoing I have hereunto set my hand at Manitowoc in the county of Manitowoc and State of Wisconsin in the presence of two witnesses.

LOUIS FRANZMEIER.

Witnesses:
  FRANK VRANEY,
  E. S. CROWE.